US005616917A

United States Patent [19]
Dai

[11] Patent Number: 5,616,917
[45] Date of Patent: Apr. 1, 1997

[54] DEVICE FOR MEASURING AN ANGLE BETWEEN PIVOTALLY-CONNECTED MEMBERS

[75] Inventor: YuZhong Dai, Coventry, R.I.

[73] Assignee: Brown & Sharpe Manufacturing Company, North Kingstown, R.I.

[21] Appl. No.: 441,967

[22] Filed: May 16, 1995

[51] Int. Cl.⁶ ............................... G01B 11/02; B25J 9/02
[52] U.S. Cl. ..................... 250/237 G; 250/231.14; 356/363; 356/395; 33/25.1; 318/568.16; 318/568.19; 901/15; 901/16; 901/47
[58] Field of Search ................. 250/237 G, 231.13, 250/231.14, 231.18, 216, 237 R; 356/358, 355, 356, 357, 363, 395; 33/1 M, 25.1, 25.2; 414/733, 738, 917; 318/568.16, 568.19; 901/15, 16, 46, 47

[56] References Cited

U.S. PATENT DOCUMENTS

| | | | |
|---|---|---|---|
| 1,987,773 | 1/1935 | Eppenstein | 33/185 |
| 2,438,667 | 3/1948 | Hogue | 33/174 |
| 2,813,346 | 11/1957 | Rachner | 33/174 |
| 3,703,968 | 11/1972 | Uhrich et al. | 214/147 T |
| 3,799,678 | 3/1974 | Kerr | 356/373 |
| 3,982,106 | 9/1976 | Stutz | 235/92 GC |
| 4,221,953 | 9/1980 | Kiilunen | 219/125.1 |
| 4,329,110 | 5/1982 | Schmid | 414/730 |
| 4,329,111 | 5/1982 | Schmid | 414/733 |
| 4,341,502 | 7/1982 | Makino | 414/744 R |
| 4,509,002 | 4/1985 | Hollis, Jr. | 318/687 |
| 4,744,152 | 5/1988 | Roach et al. | 33/471 |
| 4,766,675 | 8/1988 | Liu | 33/529 |
| 4,812,104 | 3/1989 | Suzuki | 414/735 |
| 4,891,889 | 1/1990 | Tomelleri | 33/503 |
| 4,894,595 | 1/1990 | Sogawa et al. | 318/568.24 |
| 4,916,822 | 4/1990 | Johnson | 33/458 |
| 4,939,678 | 7/1990 | Beckwith, Jr. | 364/571.02 |
| 4,975,016 | 12/1990 | Pellanc et al. | 414/501 |
| 5,180,955 | 1/1993 | Karidis et al. | 318/568.1 |
| 5,181,809 | 1/1993 | Martin | 408/3 |
| 5,189,804 | 3/1993 | Ostachowski | 33/471 |
| 5,424,833 | 6/1995 | Huber et al. | 356/356 |

FOREIGN PATENT DOCUMENTS

3-100416  4/1991  Japan.

Primary Examiner—Edward P. Westin
Assistant Examiner—John R. Lee
Attorney, Agent, or Firm—Wolf, Greenfield & Sacks, P.C.

[57] ABSTRACT

A device for measuring an angle between pivotally connected, intersecting sides of a parallelogram includes a grating having a pattern of parallel, straight grating lines formed on a substrate, and a read head. The grating is mounted in a fixed position with respect to a first side of the parallelogram. The read head includes a sensor positioned for sensing displacement of the grating lines in response to an angular change between the intersecting sides of the parallelogram and generating a scale reading. The read head is mounted in a fixed position with respect to a second side of the parallelogram that is parallel to the first side. In one embodiment, the grating includes a single pattern of grating lines and is used to measure an angular change relative to a reference angle. In a second embodiment, the grating includes first and second grating patterns and is used to measure an absolute value of the angle between the intersecting sides of the parallelogram. The precision angle measuring device is particularly useful in coordinate measuring machines, but is not limited to such use.

18 Claims, 8 Drawing Sheets

DEVICE FOR MEASURING AN ANGLE BETWEEN PIVOTALLY-CONNECTED MEMBERS

FIELD OF THE INVENTION

This invention relates to precision angle measuring devices and, more particularly, to devices that use parallel, straight grating lines for measurement of the angle between adjacent sides of a parallelogram. The angle measuring devices are particularly useful in coordinate measuring machines, but are not limited to such use.

BACKGROUND ON THE INVENTION

Coordinate measuring machines are used for dimensional inspection of workpieces such as machined parts. A workpiece is typically secured to a table, and a measuring probe is movable within a measuring volume. Measuring scales monitor the position of the probe within the measuring volume. To measure the coordinates of a point on the workpiece, the probe is brought into contact with the point, and the X, Y and Z measuring scales of the machine are read. To measure a distance between two points, the points are contacted successively, the coordinates of both points are read and distance is calculated from the coordinates. State of the art coordinate measuring machines have refinements such as high resolution measuring systems, electrical contact probes, motor drives, computer control drives and computer acquisition and processing of data.

Conventional moving bridge coordinate measuring machines (CMM) include a bridge that moves in the Y direction along guideways on the table of the CMM. A carriage moves in the X direction along guideways on the bridge. A ram with a probe mounted to its lower end moves vertically through bearings in the carriage. Scale systems between the bridge and the table, between the carriage and the bridge, and between the ram and the carriage indicate the positions of the movable elements in three orthogonal directions. A moving bridge CMM is disclosed, for example, in U.S. Pat. No. 4,939,678, issued Jul. 3, 1990 to Beckwith, Jr. Another prior art coordinate measuring machine is the horizontal arm machine, wherein a horizontal ram is supported by a Z carriage on a Z rail.

Prior art coordinate measuring machines provide highly satisfactory performance, in terms of both accuracy and reliability. However, such systems are relatively costly because of their complexity and because of the need for precision mechanical parts, such as the guideways upon which precision air bearings carry a carriage or a ram. It is desirable to provide coordinate measuring machines which are highly accurate and reliable, yet are simple in construction and low in cost.

Various pivoting manipulators and articulated arms have been disclosed in the prior art. Japanese Document No. 3-100416, published Apr. 25, 1991, discloses apparatus for determining the position of a detecting probe which utilizes a pivoting linkage. U.S. Pat. No. 4,341,502, issued Jul. 27, 1982 to Makino, discloses an assembly robot which includes a quadrilateral link mechanism for controlling the position and the attitude of a workpiece. U.S. Pat. No. 5,180,955, issued Jan. 19, 1993 to Karidis et al, discloses positioning apparatus which includes a multibar linkage drive mechanism. U.S. Pat. No. 4,329,111, issued May 11, 1982 to Schmid, discloses a mechanical manipulator including an articulated arm having a first member pivotally connected to a first pivot axis and a second member pivotally connected at a second pivot axis to the first member. U.S. Pat. No. 4,894,595, issued Jan. 16, 1990 to Sogawa et al, discloses an industrial robot having a movable arm with a support element which maintains a parallelogram shape throughout the range of motion of the arm. U.S. Pat. No. 3,703,968, issued Nov. 28, 1972 to Uhrich et al, discloses a manipulator arm having two parallelogram linkages in combination with a trapezium linkage. Insofar as known to applicants, prior art coordinate measuring machines have not utilized pivoting mechanical structures for positioning a measuring probe. A significant problem in applying pivoting mechanical strucutures for positioning a probe in a coordinate measuring machine is that of measuring the angles of the pivoting structure with the required precision at an acceptable cost.

SUMMARY OF THE INVENTION

In accordance with the present invention, a device for measuring an angular change between pivotally connected, intersecting sides of a parallelogram is provided. The device comprises a grating having a pattern of parallel, straight grating lines formed on a substrate, and a read head. The grating is adapted for mounting in a fixed position with respect to a first side of the parallelogram. The read head includes a sensor positioned for sensing displacement of the grating lines in response to an angular change between the intersecting sides of the parallelogram and generating a scale reading representative of the angular change. The read head is adapted for mounting in a fixed position with respect to a second side of the parallelogram that is parallel to the first side.

In a preferred embodiment, the grating lines are oriented at an angle with respect to the first side of the parallelogram and are equally spaced. The pattern of grating lines may be arc shaped such that the sensor follows the pattern as the parallelogram changes shape. The device may include a circuit responsive to the scale reading for generating a value representative of an angle between the intersecting sides of the parallelogram.

According to another aspect of the invention, a device for measuring an angle between pivotally connected, intersecting sides of a parallelogram is provided. The device comprises a grating having a first grating pattern and a second grating pattern formed on a substrate, and a read head. The first grating pattern comprises a plurality of parallel, straight grating lines. The grating is adapted for mounting in a fixed position with respect to a first side of the parallelogram. The read head includes first and second sensors for sensing displacement of the first and second grating patterns, respectively, in response to an angular change between the intersecting sides of the parallelogram and generating first and second scale readings representative of the angle. The read head is adapted for mounting in a fixed position with respect to a second side of the parallelogram that is parallel to the first side.

In a first embodiment, the second grating pattern comprises a plurality of parallel, straight grating lines at an angle to the grating lines of the first grating pattern. In a second embodiment, the second grating pattern comprises a marking pattern representative of displacement from a reference point. The device may further include a circuit responsive to the first and second scale readings for generating a value representative of the angle.

Preferably, the grating lines of the first grating pattern are oriented at an angle with respect to the first side of the parallelogram. The angle is preferably selected such that the orientation angle plus the angle being measured is approximately equal to 90°.

According to a further aspect of the invention, a device for measuring an angular change between pivotally connected first and second elements is provided. The device comprises means for converting angular motion of the second element relative to the first element into linear motion of a third element relative to the first element, a grating comprising a pattern of parallel, straight lines formed on a substrate, and a read head. The grating is mounted in a fixed position with respect to the first element. The read head includes a sensor for sensing displacement of the grating lines in response to an angular change between the first and second elements and generating a signal representative of the angular change. The read head is mounted in a fixed position with respect to the third element.

BRIEF DESCRIPTION OF THE DRAWINGS

For a better understanding of the present invention, reference is made to the accompanying drawings, which are incorporated herein by reference and in which.

DETAILED DESCRIPTION

A coordinate measuring machine is illustrated in FIGS. 1–5. The major components of the coordinate measuring machine include an optional table 10 for holding workpiece 11 for measurement, a column, or support structure 12, an articulated arm 14 and a Z-ram assembly 16. When table 10 is not utilized, the support structure 12 is mounted on or adjacent to a surface plate or other suitable surface for holding a workpiece. The coordinate measuring machine also includes a measuring assembly for determining coordinates as described below. The support structure 12 may be in the form of a vertical post and functions as a support for one end of the articulated arm 14. The support structure 12 is fixed in position relative to table 10 and may be attached to table 10. The articulated arm 14 is pivotally attached to support structure 12. More particularly, the articulated arm 14 includes a first arm assembly 20 pivotally connected to the support structure 12 and a second arm assembly 22 pivotally connected to the first arm assembly. The first and second arm assemblies 20 and 22 pivot about vertical axes so that end 24 of the articulated arm 14 is movable in a horizontal plane.

Figure 1:
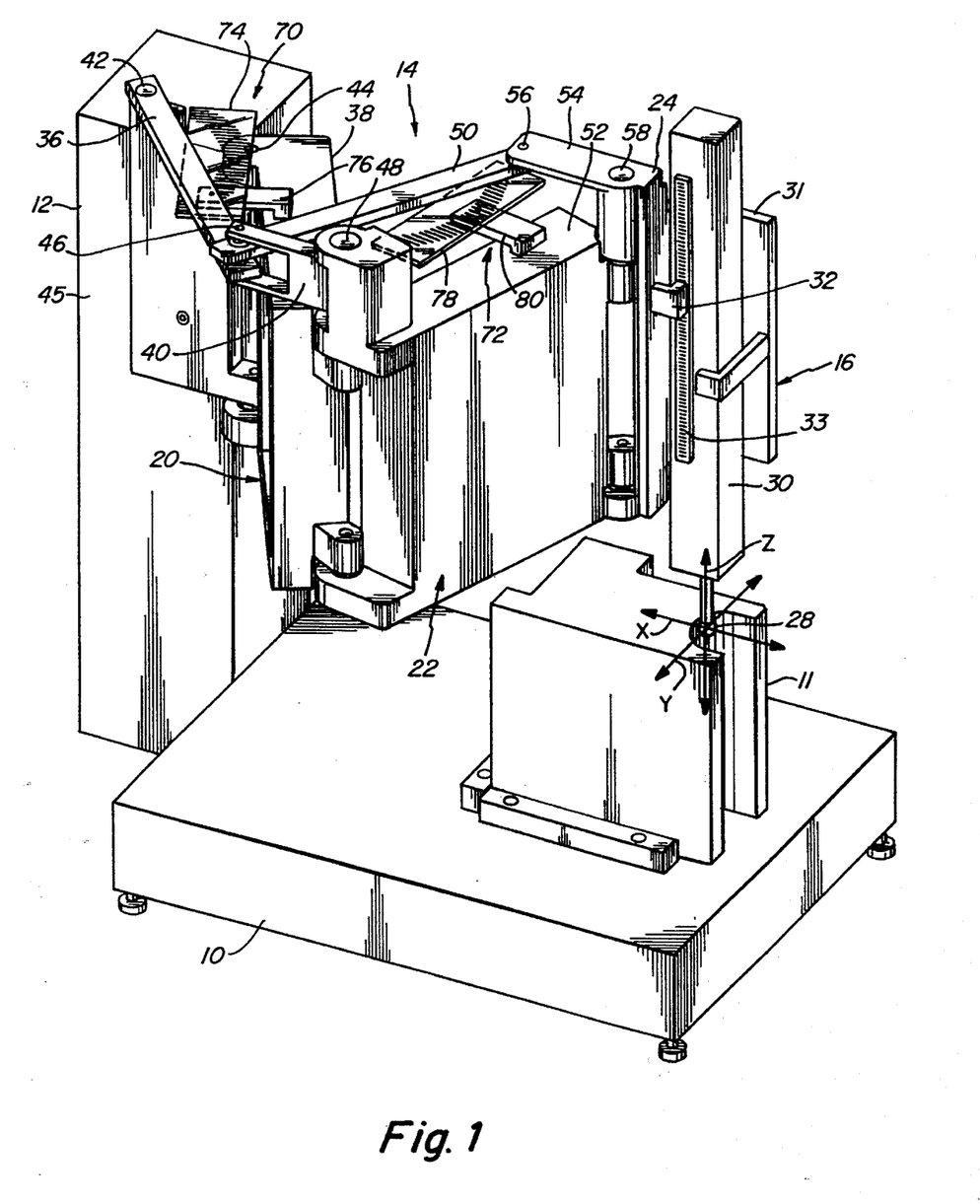
FIG. 1 is a left, front, top perspective view of a coordinate measuring machine.
Figure 2:
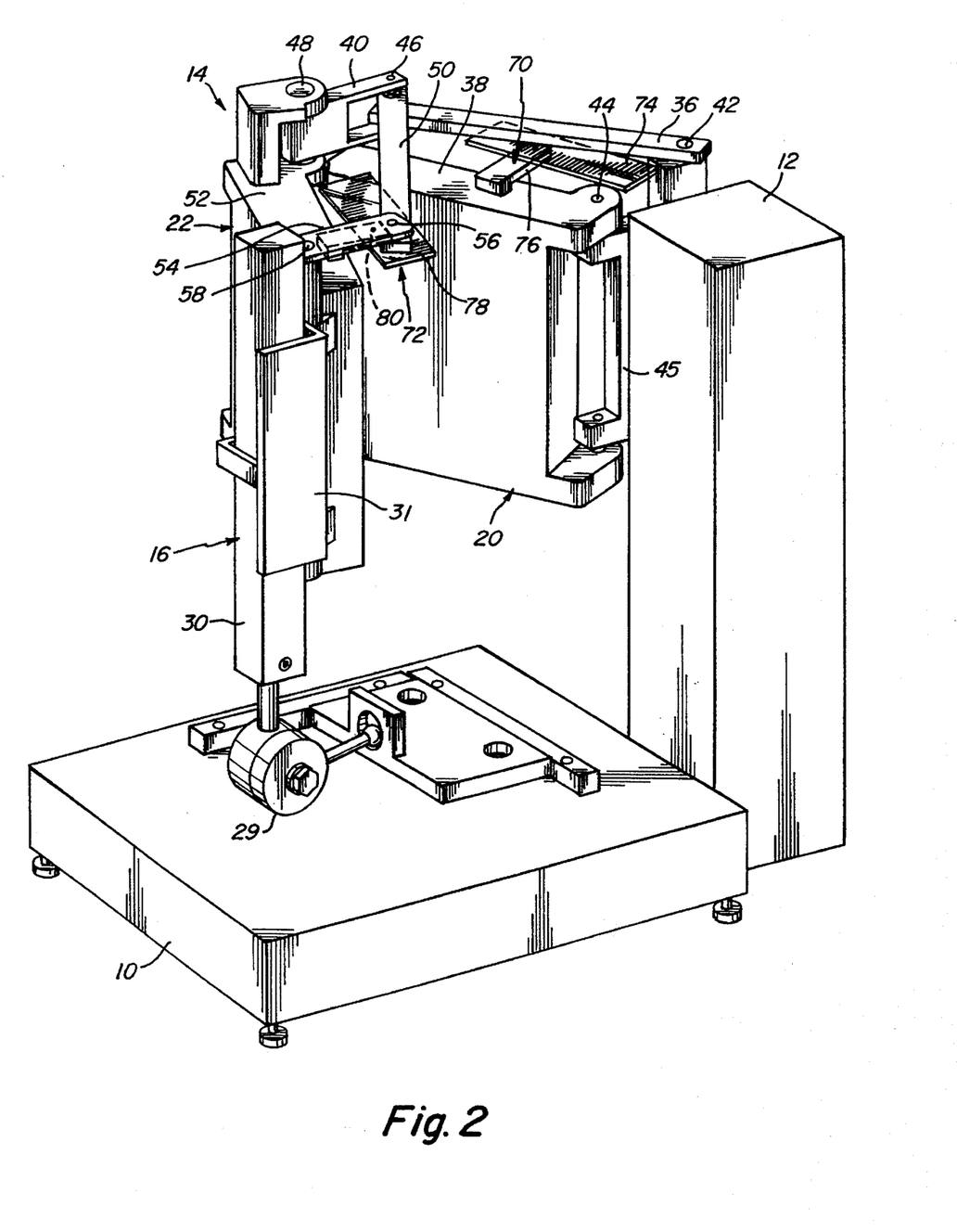
FIG. 2 is a right, front, top perspective view of the coordinate measuring machine of FIG. 1, showing use with an alternate probe fixture.

The Z-ram assembly 16 is shown schematically in FIGS. 1–5 for ease of understanding. The Z-ram assembly 16 is mounted to end 24 of articulated arm 14 and includes a Z-ram 30 that is vertically movable with respect to a Z-ram housing 31. The Z-ram housing 31 is securely mounted to end 24 of articulated arm 14. A probe 28 is removably attached to the Z-ram 30. Thus, by vertical movement of probe 28 with respect to Z-ram housing 31 and movement of articulated arm 14 in the horizontal plane, the probe 28 is movable within a three-dimensional measurement volume of the coordinate measuring machine. The X, Y and Z directions of probe movement are indicated in FIG. 1. The movement of probe 28 is typically manually controlled by the machine operator. The Z-ram assembly 16 preferably includes bearings 35 between the Z-ram 30 and the Z-ram housing 31 for permitting vertical movement of Z-ram 30 and a counterbalance (not shown) for maintaining the Z-ram 30 in a desired vertical position.

The dimensions of the measurement volume are defined in the horizontal plane by the range of movement of the articulated arm 14 and in the vertical direction by the range of movement of probe 28 with respect to Z-ram housing 31. By determining the angle of first arm assembly 20 with respect to support structure 12, the angle of second arm assembly 22 with respect to first arm assembly 20 and the vertical position of the probe 28 with respect to the housing 31, the measuring assembly determines the coordinates of the probe 28 in the measurement volume.

The first arm assembly 20 includes a first arm member 36, a second arm member 38 and a first link member 40. The first arm member 36 is pivotally connected to a bracket 45 at a first pivot axis 42, and the second arm member 38 is pivotally connected to bracket 45 at a second pivot axis 44. The bracket 45 is rigidly mounted to support structure 12. The first arm member 36 and the link member 40 are pivotally connected at a third pivot axis 46, and the second arm member 38 and the link member 40 are pivotally connected at a fourth pivot axis 48. Pivotal movement of arm assembly 20 is indicated by arrow 49 in FIG. 3. The range of motion of arm assembly 20 is indicated by arrow 47 in FIG. 5.

The second arm assembly 22 includes a third arm member 50, a fourth arm member 52 and a second link member 54. The third arm member 50 is pivotally connected to first arm member 36 and link member 40 at the third pivot axis 46. The fourth arm member 52 is pivotally connected to second arm member 38 and link member 40 at the fourth pivot axis 48. The third arm member 50 is pivotally connected to link member 54 at a fifth pivot axis 56, and the fourth arm member 52 is pivotally connected to link member 54 at a sixth pivot axis 58. Pivotal movement of arm assembly 22 is indicated by arrow 59 in FIG. 3. The range of motion of arm assembly 22 is indicated by arrow 57 in FIG. 5. The Z-ram assembly 16 is rigidly mounted to second link member 54. The pivot axes 42, 44, 46, 48, 56 and 58 are parallel to each other and are typically oriented vertically.

Figure 3:
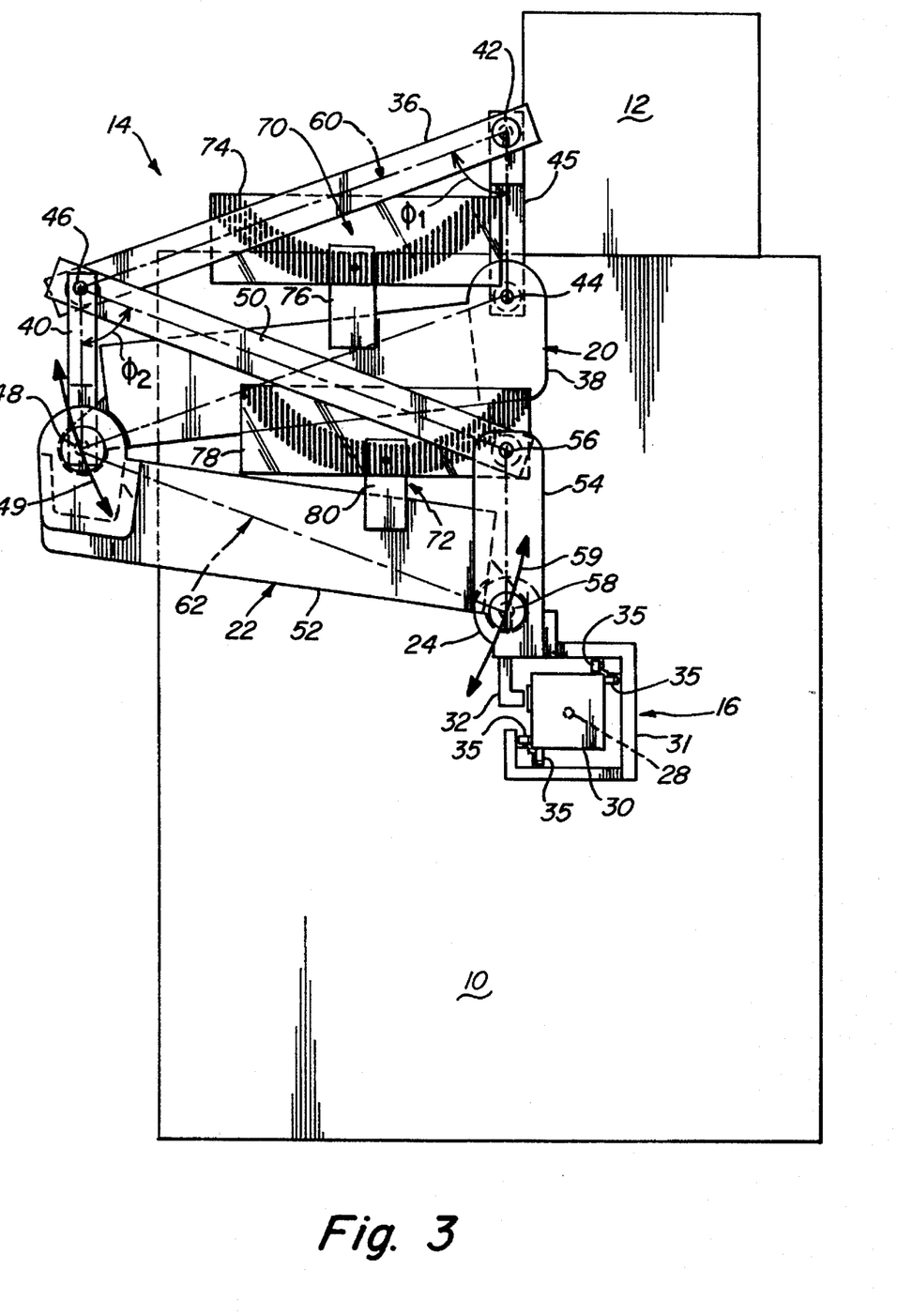
FIG. 3 is a top plan view of the coordinate measuring machine of FIG. 1.

As shown in FIG. 3, the pivot axes 42, 44, 46, 48, 56 and 58 of articulated arm 14 define two interconnnected parallelograms. More specifically, pivot axes 42, 44, 46 and 48 define vertices of a first parallelogram 60 associated with first arm assembly 20, and pivot axes 46, 48, 56 and 58 define vertices of a second parallelogram 62 associated with the second arm assembly 22. Dashed lines are drawn in FIG. 3 between pivot axes 44 and 48 and between pivot axes 48 and 58 to clearly illustrate the parallelograms, because the shapes of arm members 38 and 52 are somewhat misleading. As the articulated arm 14 moves in the horizontal plane, the angles between intersecting sides of the parallelograms 60 and 62 vary. However, opposite sides remain parallel.

The parallelogram structure of the articulated arm has an important consequence in the operation of the coordinate measuring machine. As end 24 of the articulated arm 14 is moved in the horizontal plane, the Z-ram assembly 16 also moves in the horizontal plane but does not rotate substantially with respect to the support structure 12. The substantially non-rotational movement of Z-ram assembly 16 is important when the coordinate measuring machine is used with a probe extension. For example, a probe extension 29 (shown in FIGS. 2 and 4) may be attached to Z-ram 30 in place of probe 28. The probe extension 29 extends in an arbitrary direction from the vertical axis of Z-ram assembly 16. Probe extensions may be required for measuring side features of workpieces, such as side holes or the like. It can be seen that rotation of the Z-ram assembly 16 would cause the probe extension to rotate as the probe is moved through the measurement volume. Such probe rotation would require a relatively complex calculation to determine the coordinates of the probe extension. By ensuring that the probe extension 29 does not rotate substantially as it is moved through the measurement volume, the calculation of coordinates is simplified, and a fixed correction can be made for probe extensions. Various other probes and probe extensions can be attached to the Z-ram 30 and used for coordinate measurement.

Figure 4:
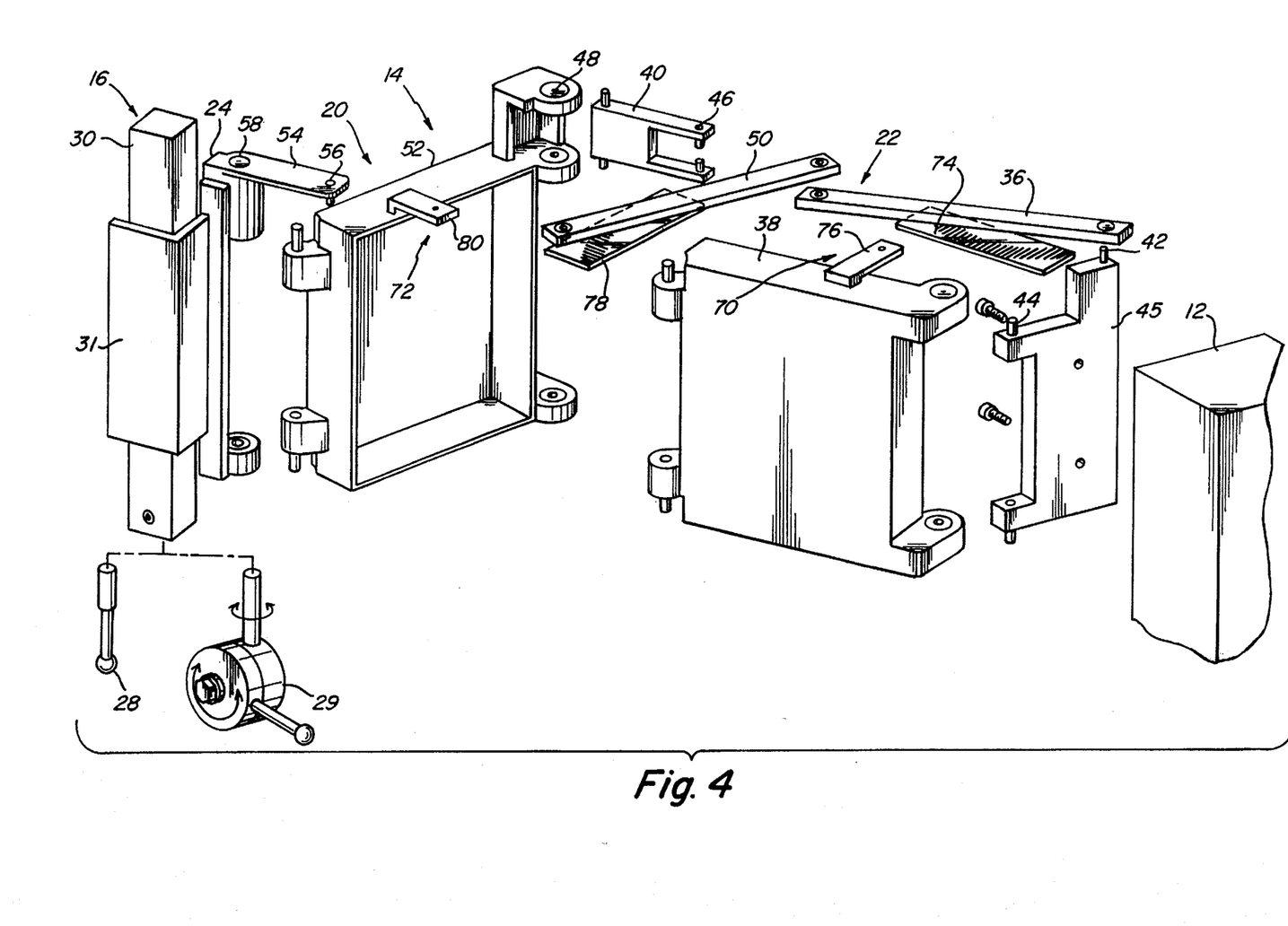
FIG. 4 is an exploded perspective view of the coordinate measuring machine of FIG. 1.
Figure 5:
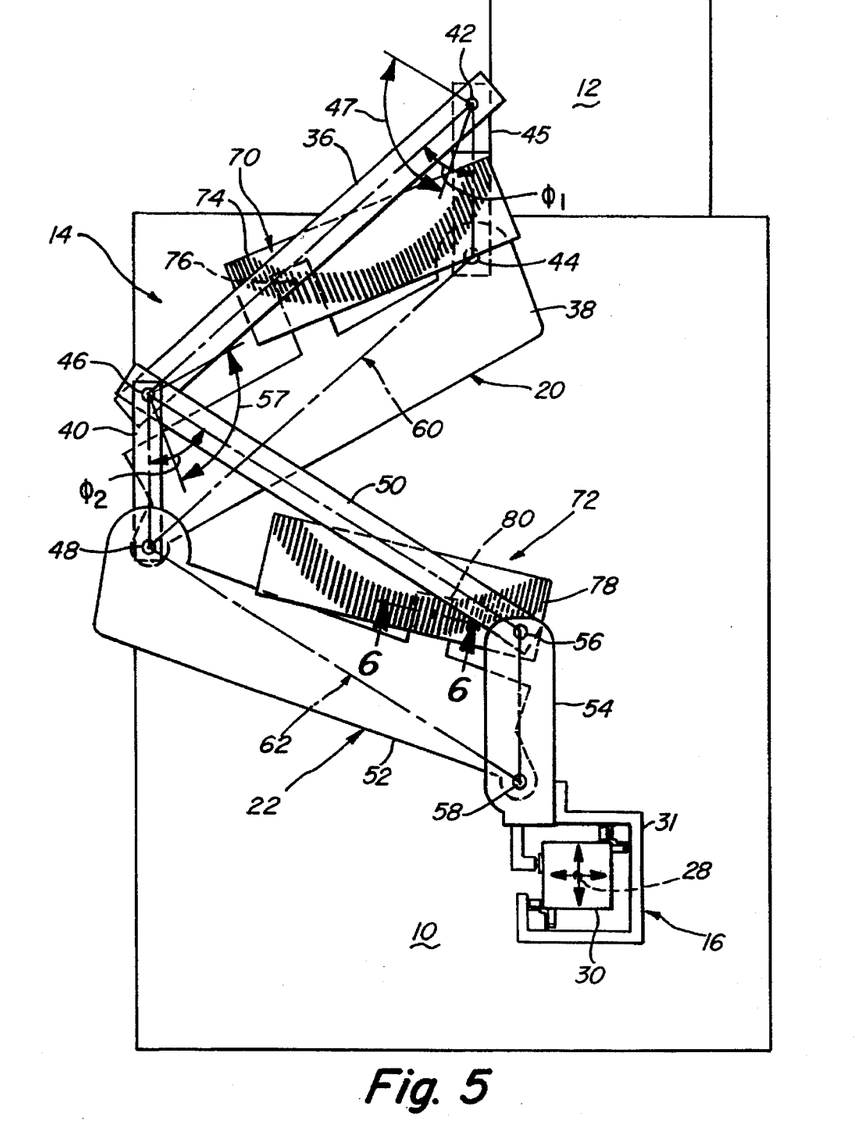
FIG. 5 is a schematic top plan view of the coordinate measuring machine of FIG. 1, with the probe shown at an arbitrary point.

As best shown in FIGS. 1 and 4, second arm member 38 and fourth arm member 52 are relatively rigid structural components of the articulated arm 14. The arm members 38 and 52 and the pivotal connections of these arm members are sufficiently rigid to move the Z-ram assembly 16 through the measurement volume with negligible bending, twisting or other distortion, which would introduce errors in the coordinate measurements. Furthermore, the pivotal connections between elements must not permit significant relative movement between the pivotally connected elements (other than rotation). By contrast, first arm member 36, first link member 40, third arm member 50 and second link member 54 are control elements which prevent substantial rotation of Z-ram assembly 16 and can be less structurally rigid than the arm members 38 and 52.

An essential component of the coordinate measuring machine is the measuring assembly which determines the position of the probe 28 in the measurement volume. In order to determine the position of probe 28, it is necessary to determine the position of end 24 of articulated arm 14 in the horizontal plane and the position of the probe 28 relative to the Z-ram housing in the vertical direction. The vertical position of probe 28 relative to Z-ram housing 31 can be determined by a scale and sensor in accordance with well-known techniques. In particular, a scale 33 is affixed to the Z-ram 30, and a sensor 32 is affixed to the end 24 of articulated arm 14 or other element which does not move vertically. The sensor 32 reads the scale 33 and generates a signal representative of the vertical displacement of the probe 28 relative to articulated arm 14.

In order to determine the position of the Z-ram assembly 16 in the horizontal plane, it is necessary to determine the angle of first arm assembly 20 relative to the support structure 12 and the angle of the second arm assembly 22 relative to the first arm assembly 20. These angles may be determined by determining the angles between intersecting sides of the parallelograms 60 and 62 associated with the articulated arm 14. In general, any suitable angle measuring device may be utilized for measuring the angles of the articulated arm 14. For example, conventional rotary encoders may be utilized. However, available rotary encoders with acceptable accuracy are relatively expensive.

A preferred angle measuring device, or angle sensor, will now be described. The preferred device provides high accuracy angle measurement at low cost. A first angle measuring device 70 is used for determining the angle of first arm assembly 20 with respect to support structure 12. More specifically, angle measuring device 70 is used for measuring an angle $\phi_1$ between a line through pivot axes 42 and 46 and a line through pivot axes 42 and 44. A second angle measuring device 72 is used for determining the angle between first arm assembly 20 and second arm assembly 22 between specifically, angle measuring device 72 is used for measuring an angle $\phi_2$ between a line through pivot axes 46 and 56 and a line through pivot axes 46 and 48.

First angle measuring device 70 includes a grating 74 mounted to first arm member 36 and a read head 76 mounted to second arm member 38. As the articulated arm 14 is moved in the horizontal plane, the parallelogram 60 changes shape, and the read head 76 moves relative to grating 74. The second angle measuring device 72 includes a grating 78 mounted to third arm member 50 and a read head 80 mounted to fourth arm member 52. As the articulated arm 14 is moved in the horizontal plane, the parallelogram 62 changes shape, and the read head 80 moves relative to grating 78. The angle measuring devices 70 and 72 are described in detail below.

Figure 7:
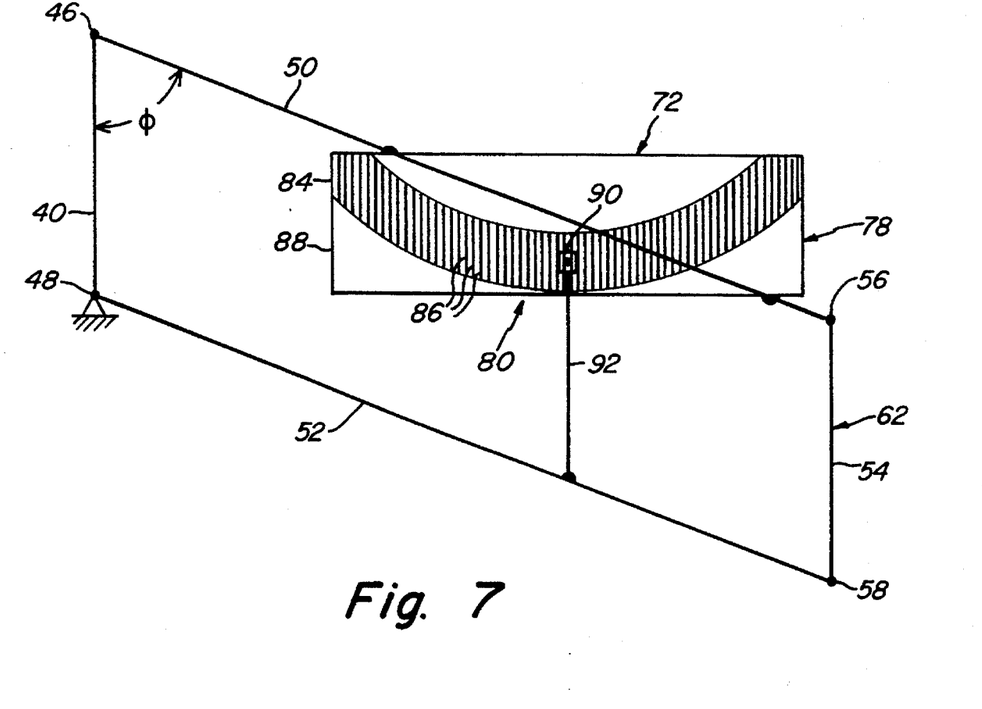
FIG. 7 is a schematic diagram of the angle measuring device used in the coordinate measuring machine.

The angle measuring device 72 is illustrated schematically in FIG. 7. It will be understood that the angle measuring device 70 preferably has the same configuration. As indicated above, arm members 50 and 52 and link members 40 and 54 define parallelogram 62. Because the sides of the parallelogram are pivotally attached at axes 46, 48, 56 and 58, the angle $\phi$ between link member 40 and arm member 50 is variable as the articulated arm 14 is moved in the horizontal plane. As further indicated above, grating 78 is rigidly mounted to arm member 50, and read head 80 is rigidly mounted to arm member 52. As the parallelogram 62 changes shape, the angle $\phi$ changes and arm member 50 moves linearly with respect to arm member 52 (since opposite sides of the parallelogram remain parallel as the parallelogram changes shape).

The grating 78 is provided with a pattern 84 of parallel, straight grating lines 86 on a substrate 88 that may be light transmissive. The grating lines may, for example, be a metal, such as chromium. The width and spacing of lines 86 is selected to provide a desired angular measurement resolution. In an example of the angle measuring device, the width of each grating line 86 is 20 micrometers, the spacing between adjacent grating lines 86 is 20 micrometers, and link members 40 and 54 have lengths of 110 millimeters. In this example, an average angular measurement resolution of 0.3 arc-second is obtained. As shown in FIG. 7, the pattern 84 of grating lines 86 may be arc-shaped to ensure that the pattern 84 remains aligned with the read head 80 as the angle $\phi$ changes.

Figure 6:
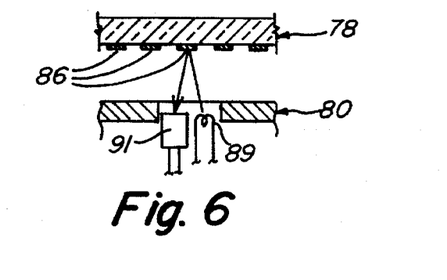
FIG. 6 is a schematic cross-sectional view of angle sensor 72, taken along line 6—6 of FIG. 5.

As shown in FIGS. 6 and 7, the read head 80 includes a sensor 90 rigidly attached to arm member 52 by a mounting bracket 92 or other suitable structure. The sensor 90 is preferably an electro-optical sensor, including a light source 89 and photodetector 91, for sensing displacement of grating lines 86 relative to read head 80.

As the arm member 50 moves linearly with respect to arm member 52, the sensor 90 senses displacement of grating lines 86 relative to read head 80. The angle measuring device 72 with a single grating pattern as shown in FIG. 7 can be used for determining the incremental angular change. In order to determine the absolute value of angle $\phi$, it is necessary to determine a starting or reference angle from which the incremental angular change is measured. The reference angle can, for example, be the angle of a "home", or starting, position of the articulated arm 14. The scale reading of the sensor 90 is related to the angle $\phi$ by:

$$A = R \times \cos(\phi + \gamma) + A_0 \tag{1}$$

where A is the scale reading at angle $\phi$, R is the length of link members 40 and 54, $\gamma$ is the tilt angle between grating lines 86 and arm member 50, and $A_0$ is the scale reading at the reference angle. In this embodiment, the value of $A_0$ is determined by moving the articulated arm to the reference angle and recording the scale reading $A_0$ of the sensor 90. Then, for a scale reading A, the angle $\phi$ is determined from equation (1).

Figure 8:
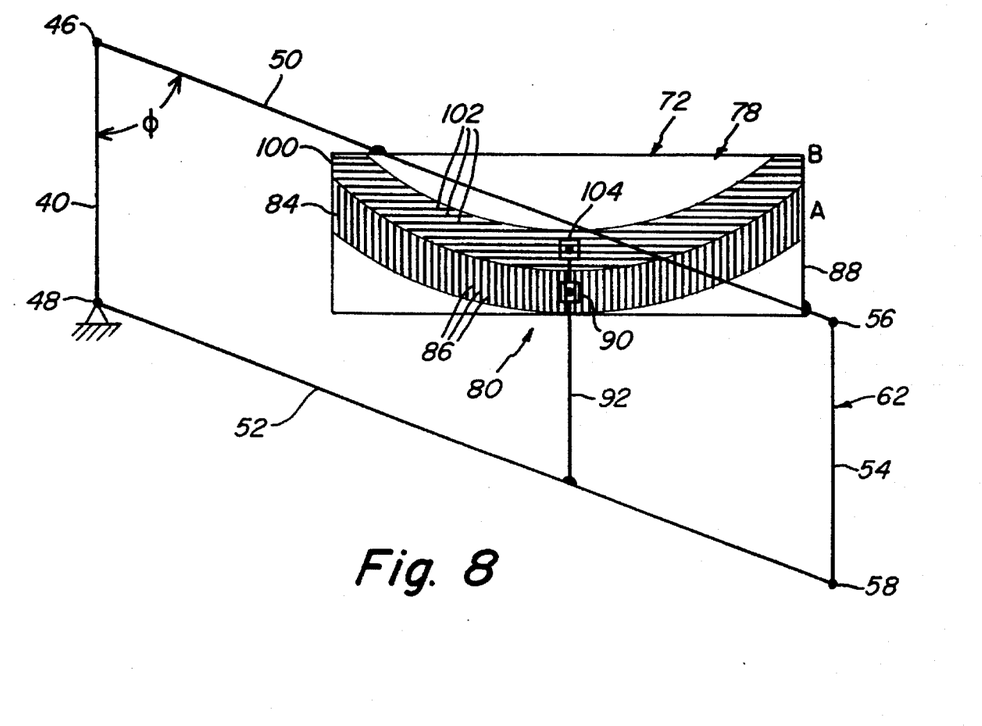
FIG. 8 is a schematic diagram of an alternate embodiment of the angle measuring device.

In other cases, it may be desirable to measure the absolute angle $\phi$ rather than the incremental angular change relative to a reference angle. The angle measuring device 72 can be configured to determine the absolute value of angle $\phi$. As shown in FIG. 8, a second pattern 100 of parallel, straight grating lines 102 is formed on substrate 88 of grating 78. The grating lines 102 are perpendicular to grating lines 86 of pattern 84. In this embodiment, the read head 80 includes, in addition to sensor 90, a second sensor 104 attached to mounting bracket 92 and positioned for sensing displacement of grating lines 102 as the angle $\phi$ varies. The angle $\phi$ is determined from the scale readings of sensors 90 and 104 as follows. Assume that sensor 90 provides a scale reading A and that sensor 104 provides a scale reading B. The tilt angle between grating lines 102 and arm member 50 is $\gamma$, and the length of link members 40 and 54 is R. Then the scale readings A and B are related to angle $\phi$ by:

$$A = R \times \cos(\phi + \gamma) + A_0 \quad (2)$$

$$B = R \times \sin(\phi + \gamma) + B_0 \quad (3)$$

where $A_0$ and $B_0$ are scale readings at the home position. The sensitivity of the measuring device is determined by differentiating equations (2) and (3).

$$dA = -R \times \sin(\phi + \gamma) \times d\phi \quad (4)$$

$$dB = R \times \cos(\phi + \gamma) \times d\phi \quad (5)$$

Given a certain linear resolution dA and dB, the sensitivity for angle $\phi$ is best at and is symmetric for $\phi + \gamma = \pi/2$. In a specific application, the angle $\phi$ may not be symmetric about $\pi/2$. In this case, the tilt angle $\gamma$ can be used to make up the difference.

Each of the scale readings A and B is incremental and is not sufficient alone to solve for angle $\phi$, given R, $\gamma$ and dA and dB, because $d\phi$ is also unknown. The combination of the scale readings, however, can be used to determine the absolute angle $\phi$. For a small motion that yields a change in scale readings $\Delta A$ and $\Delta B$, then equations (4) and (5) can be combined to yield:

$$\phi = \tan^{-1}(\Delta A/\Delta B) - \gamma \quad (6)$$

Given $\Delta A$, $\Delta B$ and $\gamma$, the angle $\phi$ can be computed from equation (6). For the example of the articulated arm 14 shown in FIGS. 1–5 and described above, the angle $\phi$ is symmetric about 70°, and the angle $\gamma$ is preferably about 20°.

A second embodiment of the grating 78 for measuring the absolute value of angle $\phi$ is now described. In this embodiment, the second pattern 100 of grating lines is representative of position along grating pattern 84. Thus, for example, the spacing between grating lines or between groups of grating lines may vary along the length of the grating pattern. The readings of sensors 90 and 104 are processed to determine an absolute angle. The details of this approach are described in U.S. Pat. No. 3,982,106, issued Sep. 21, 1976 to Stutz, the disclosure of which is hereby incorporated by reference. The grating, or scale, includes a pattern having uniformly spaced marks (pattern 84) and a second pattern (pattern 100) parallel to the first having multiple absolute value marks, each of which is spaced from the next following mark by a distance characterizing the absolute value of its distance to a reference position.

The angle measuring device 72 has been described in connection with measuring the angle $\phi$ between intersecting sides of a parallelogram. The grating or scale is fixed in position with respect to a first side of the parallelogram, and the read head is fixed in position with respect to a second side of the parallelogram that is parallel to the first side. It can be seen that the pivotally connected parallelogram converts angular motion of link member 40 with respect to arm member 52 to linear motion of arm member 50 with respect to arm member 52. More generally, the angle measuring device shown and described herein can be used for angle measurement in any situation where angular motion is converted to linear motion along a certain direction. The angle measuring device described herein has the advantage that it can be implemented at substantially lower cost than prior art angle measuring devices because of the use of parallel, straight line gratings.

Figure 9:
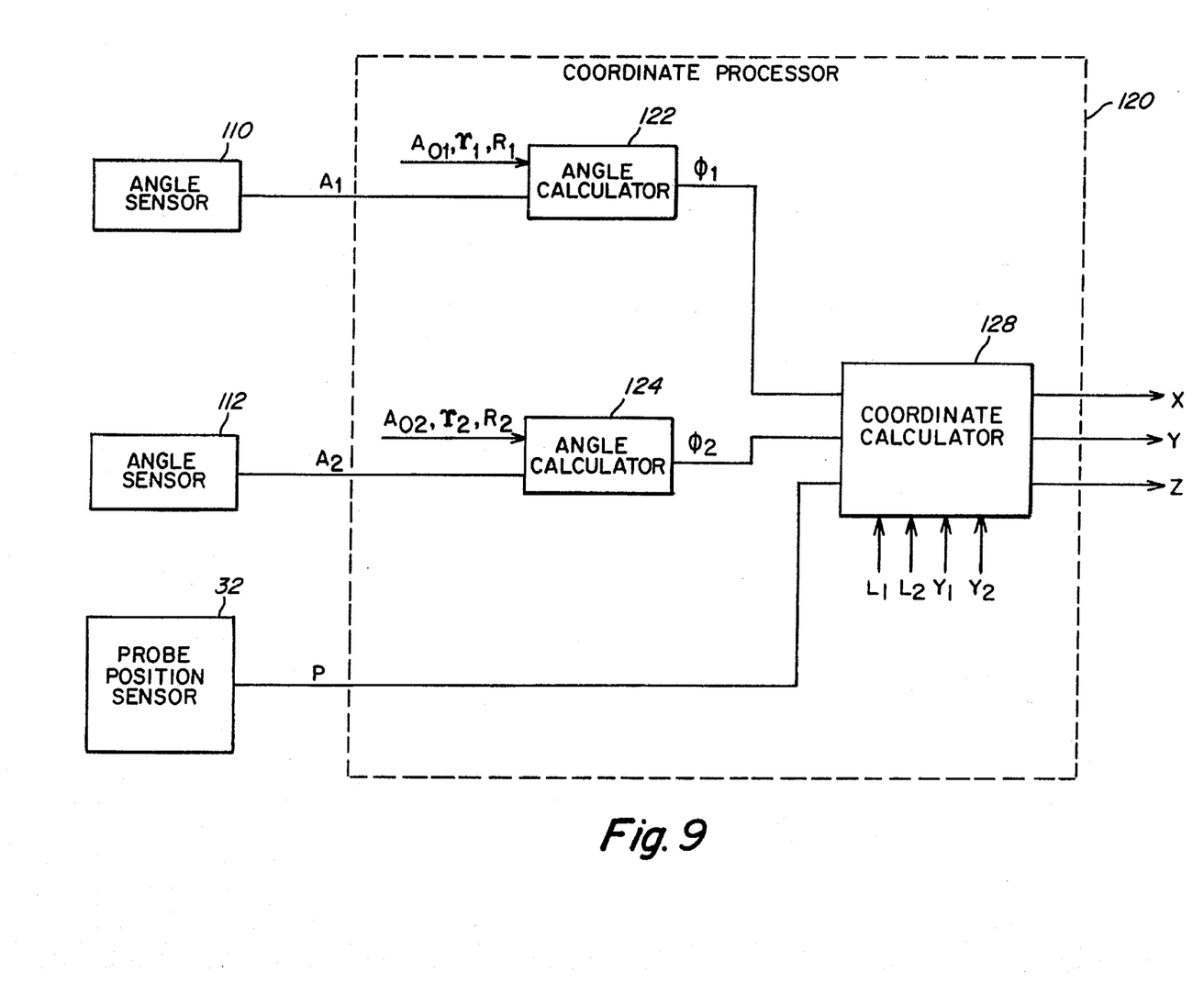
FIG. 9 is a block diagram of the measuring assembly for determining probe coordinates in the coordinate measuring machine.

A block diagram of the measuring assembly of the coordinate measuring machine is shown in FIG. 9. The measuring assembly is implemented with angle measuring devices that measure incremental angle from a home or reference angle. A sensor 110 of angle measuring device 70 corresponds to the sensor 90 shown in FIG. 7. A sensor 112 of angle measuring device 72 corresponds to the sensor 90 shown in FIG. 7. The probe position sensor 32 is shown in FIG. 1. The sensors 110, 112 and 32 provide scale readings to a coordinate processor 120. The coordinate processor 120 includes an angle calculator 122 which converts a scale reading $\Delta A_1$ from sensor 110 and constants $A_{01}$, $\gamma_1$ and $R_1$ to an angle $\phi_1$ of the first arm assembly 20 with respect to support structure 12 using equation (1). An angle calculator 124 converts a scale reading $\Delta A_2$ from sensor 110 and constants $A_{02}$, $\gamma_2$ and $R_2$ to an angle $\phi_2$ of second arm assembly 22 with respect to first arm assembly 20 using equation (1). The constants $A_{01}$ and $A_{02}$ represent scale readings at the home positions of sensors 110 and 112, respectively. The constants $\gamma_1$ and $\gamma_2$ represent the angles between the grating lines 86 and arm member 50 (see FIG. 7) for measuring devices 70 and 72, respectively. The constants $R_1$ and $R_2$ represent the lengths of the link members 40 and 54 of measuring devices 70 and 72, respectively. The angle $\phi_1$ from angle calculator 122, the angle $\phi_2$ from angle calculator 124 and the probe vertical position P from probe position sensor 32 are provided to a coordinate calculator 128. The coordinate calculator combines these values according to the following equations:

$$X = L_1 \cdot \cos(\phi_1 + \gamma_1) + L_2 \cdot \cos(\phi_2 + \gamma_2) \quad (7)$$

$$Y = -L_1 \cdot \sin(\phi_1 + \gamma_1) + L_2 \cdot \sin(\phi_2 + \gamma_2) \quad (8)$$

where X and Y represent the X and Y coordinates of probe 28, $L_1$ represents the distance between axes 44 and 48 (FIG. 3) and $L_2$ represents the distance between axes 48 and 58. Pivot axis 44 is preferably designated as the origin of the X-Y plane for coordinate measurements. The coordinate calculator 128 determines the X, Y and Z coordinates of the probe 20 in the measurement volume. The coordinate processor 120 may be implemented as a microprocessor that is programmed to solve the specified equations.

In an example of the coordinate measuring machine of the present invention, the measurement volume has dimensions of 300 millimeters on a side. The measurement accuracy within the measurement volume is about 0.02 millimeter. The disclosed coordinate measuring machine provides high accuracy measurement at relatively low cost. Since no air bearings are required for suspension of machine components such as carriages and rams, no supply air pump is required in the machine.

Figure 10:
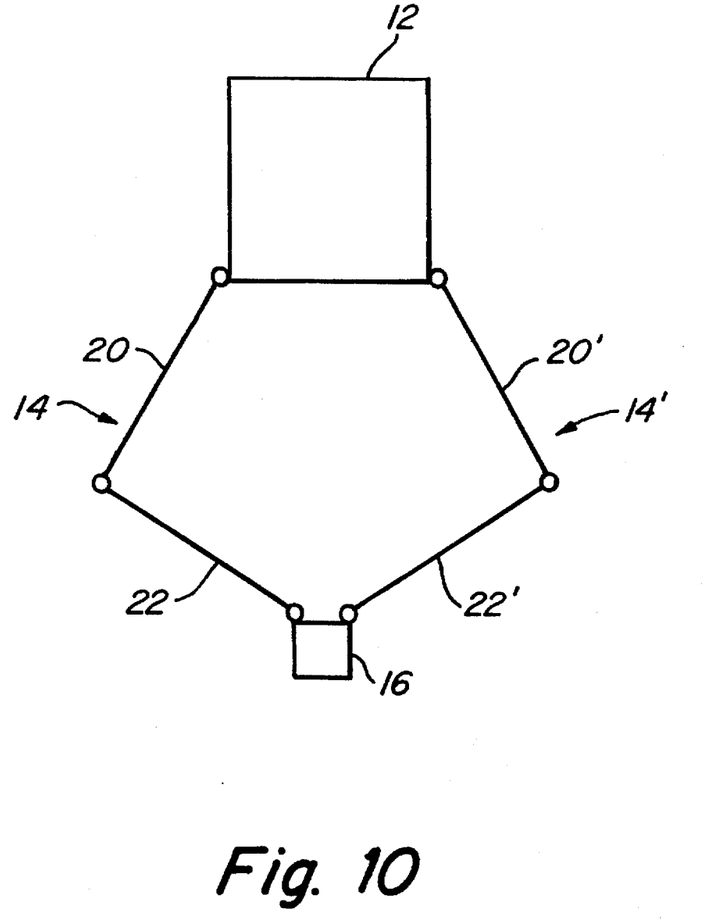
FIG. 10 is a schematic top view of an alternate embodiment of the coordinate measuring machine.

An alternative embodiment of the coordinate measuring machine is shown schematically in FIG. 10. The first end of articulated arm 14 is pivotally connected to support structure 12, and the second end of articulated arm 14 is movable in a horizontal plane, as shown and described above. Z-ram assembly 16 is mounted to the second end of articulated arm 14. As described above, articulated arm 14 includes first arm assembly 20 and second arm assembly 22. The coordinate measuring machine shown in FIG. 10 additionally includes a second articulated arm 14' having a first end pivotally connected to support structure 12 and a second end that is movable in the horizontal plane. The Z-ram assembly 16 is also mounted to the second end of articulated arm 14'. The articulated arm 14' is essentially a mirror image of the articulated arm 14. Thus, a first arm assembly 20' is a mirror image of first arm assembly 20, and a second arm assembly 22' is a mirror image of second arm assembly 22. The embodiment of FIG. 10 provides somewhat more rigid support of Z-ram assembly 16 than the embodiment shown in FIGS. 1–5 and described above.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A device for measuring an angular change between pivotally-connected, intersecting sides of a parallelogram, comprising:
    a grating comprising a pattern of parallel, straight grating lines formed on a substrate mounted in a fixed position with respect to a first side of said parallelogram; and
    a read head, including a sensor, mounted in a fixed position with respect to a second side of said parallelogram that is parallel to said first side, said read head traveling in an arc-shaped path relative to said grating lines as said parallelogram changes shape, for sensing displacement of said grating lines relative to said read head in response to an angular change between said intersecting sides of said parallelogram, and for generating a scale reading representative of said angular change.

2. A device as defined in claim 1 wherein the grating lines of said pattern of grating lines are oriented at an angle with respect to the first side of said parallelogram.

3. A device as defined in claim 1 wherein said sensor comprises an electro-optical device for reading said grating lines.

4. A device as defined in claim 1 wherein the grating lines of said pattern are equally spaced.

5. A device as defined in claim 1 wherein said pattern of grating lines is arc shaped such that said sensor follows said pattern as said parallelogram changes shape.

6. A device as defined in claim 1 further including a circuit responsive to said scale reading for generating a value representative of an angle between said intersecting sides of said parallelogram.

7. A device as defined in claim 6 wherein said circuit generates said value in accordance with:

$$A = R \times \cos(\phi + \gamma) + A_0$$

where A is said scale reading, $\phi$ is said angle, R is the length of a parallelogram side interconnecting said first and second sides, $\gamma$ is a tilt angle between said grating lines and said first side of said parallelogram, and $A_0$ is a reference angle scale reading.

8. A device for measuring an angle between pivotally-connected, intersecting sides of a parallelogram, comprising:

a grating, mounted in a fixed position with respect to a first side of said parallelogram, having a first grating pattern and a second grating pattern formed on a substrate, said first and second grating patterns comprising a plurality of parallel, straight grating lines; and a read head, including first and second sensors, mounted in a fixed position with respect to a second side of said parallelogram that is parallel to said first side, said read head traveling in an arc-shaped path over said first and second grating patterns, respectively, to sense displacement of said first and second grating patterns relative to said read head, generating first and second scale readings representative of said angle.

9. A device as defined in claim 8 wherein said second grating pattern comprises a plurality of parallel, straight grating lines at an angle to the grating lines of said first grating pattern.

10. A device as defined in claim 9 wherein the grating lines of said first grating pattern are oriented at an angle $\gamma$ with respect to the first side of said parallelogram.

11. A device as defined in claim 10 wherein the acute angle $\gamma$ is selected such that the angle $\gamma$ plus the angle $\phi$ being measured is approximately equal to 90°.

12. A device as defined in claim 8 wherein said second grating pattern comprises a marking pattern representative of displacement from a reference point.

13. A device as defined in claim 8 wherein said first and second sensors each comprise an electro-optical device for reading said grating lines.

14. A device as defined in claim 8 wherein the grating lines of said first grating pattern are equally spaced.

15. A device as defined in claim 8 wherein said first and second grating patterns are arc shaped such that said first and second sensors remain aligned with said first and second grating patterns, respectively, as said parallelogram changes shape.

16. A device as defined in claim 8 further including a circuit responsive to said first and second scale readings for generating a value representative of said angle.

17. A device as defined in claim 16 wherein said circuit calculates said angle in accordance with:

$$\phi = \tan^{-1}(\Delta A / \Delta B) - \gamma$$

where $\Delta A$ and $\Delta B$ represent changes in said first and second scale readings respectively, and $\gamma$ represents an angle between the grating lines of said first grating pattern and the first side of said parallelogram.

18. A device for measuring an angular change between pivotally-connected first and second elements, comprising:
    means for converting angular motion of said second element relative to said first element into linear motion of a third element relative to said first element;
    a grating comprising a pattern of parallel, straight grating lines formed on a substrate, said grating being mounted in a fixed position with respect to said first element; and
    a read head including a sensor, mounted in a fixed position with respect to said third element, said read head traveling in an arc-shaped path over said grating to sense displacement of said grating lines relative to said read head in response to an angular change between said first and second elements and generating a signal representative of said angular change.

* * * * *